(12) United States Patent
Halley et al.

(10) Patent No.: US 9,954,816 B2
(45) Date of Patent: Apr. 24, 2018

(54) DELEGATION OF CONTENT DELIVERY TO A LOCAL SERVICE

(71) Applicant: Nominum, Inc., Redwood City, CA (US)

(72) Inventors: Robert Thomas Halley, Redwood City, CA (US); Brian Wellington, Fremont, CA (US); Robert S. Wilbourn, Palo Alto, CA (US); Srinivas Avirneni, Austin, TX (US)

(73) Assignee: Nominum, Inc., Redwood City, CA (US)

( * ) Notice: Subject to any disclaimer, the term of this patent is extended or adjusted under 35 U.S.C. 154(b) by 121 days.

(21) Appl. No.: 14/930,554

(22) Filed: Nov. 2, 2015

(65) Prior Publication Data
US 2017/0126616 A1    May 4, 2017

(51) Int. Cl.
*G06F 15/16*    (2006.01)
*H04L 29/12*    (2006.01)
*H04L 29/06*    (2006.01)
*G06F 21/50*    (2013.01)

(52) U.S. Cl.
CPC .......... *H04L 61/1511* (2013.01); *H04L 29/06* (2013.01); *H04L 61/1535* (2013.01); *H04L 61/1552* (2013.01); *G06F 21/50* (2013.01)

(58) Field of Classification Search
CPC .... H04L 29/08072; H04L 29/06; G06F 21/50
USPC ................ 709/203, 220, 224, 228
See application file for complete search history.

(56) References Cited

U.S. PATENT DOCUMENTS

| 6,108,703 | A  | 8/2000  | Leighton et al. |
| 6,405,252 | B1 | 6/2002  | Gupta et al. |
| 6,484,143 | B1 | 11/2002 | Swildens et al. |
| 6,694,358 | B1 | 2/2004  | Swildens et al. |
| 6,754,699 | B2 | 6/2004  | Swildens et al. |
| 6,754,706 | B1 | 6/2004  | Swildens et al. |
| 7,010,578 | B1 | 3/2006  | Lewin et al. |
| 7,478,148 | B2 | 1/2009  | Neerdaels |

(Continued)

FOREIGN PATENT DOCUMENTS

WO    WO2015100283 A1    7/2015

OTHER PUBLICATIONS

G. Bertrand et al. RFC 6770 Use Cases for Content Delivery Network Interconnection IETF Nov. 2012 16 pages.

(Continued)

*Primary Examiner* — Khanh Dinh (57) ABSTRACT

Provided is a method for delegation of local content delivery service. The method includes receiving a Domain Name System (DNS) query from a client to resolve a domain name to a network address associated with content provider by a content provider, determining that distribution of the content has been delegated by a content provider to a local content server associated with an Internet Service Provider (ISP), and based on predetermined criteria, resolving the domain name to the local content server. The resolution can include responding to the DNS query with an answer from a caching server, and returning, to the client, the answer pointing to the local content server, wherein upon receiving the answer, the client can establish a data communication channel with the local content server. The content can be downloaded to the local content server upon a request received by a provisioning system associated with the ISP.

18 Claims, 4 Drawing Sheets

(56) References Cited

U.S. PATENT DOCUMENTS

| | | | |
|---|---|---|---|
| 7,725,602 B2 | 5/2010 | Liu et al. | |
| 7,991,910 B2* | 8/2011 | Richardson | H04L 29/12066 709/203 |
| 8,117,296 B2 | 2/2012 | Liu et al. | |
| 8,234,403 B2* | 7/2012 | Richardson | H04L 29/12066 709/203 |
| 8,275,867 B2 | 9/2012 | Neerdaels | |
| 8,341,297 B2 | 12/2012 | Swildens et al. | |
| 8,423,672 B2 | 4/2013 | Liu et al. | |
| 8,909,699 B2 | 12/2014 | Neerdaels | |
| 9,037,738 B2* | 5/2015 | Haghpassand | G06F 21/50 709/223 |
| 9,112,764 B2* | 8/2015 | Howard | H04L 45/16 |
| 9,544,183 B2 | 1/2017 | Hluchyj et al. | |
| 2009/0300196 A1* | 12/2009 | Haghpassand | G06F 21/50 709/229 |
| 2011/0219109 A1 | 9/2011 | Zehavi et al. | |
| 2012/0066408 A1* | 3/2012 | Richardson | H04L 29/12066 709/238 |
| 2012/0096106 A1 | 4/2012 | Blumofe et al. | |
| 2012/0209942 A1 | 8/2012 | Zehavi et al. | |
| 2013/0205045 A1* | 8/2013 | Richardson | H04L 29/12066 709/245 |
| 2013/0268633 A1* | 10/2013 | Richardson | H04L 29/12066 709/219 |
| 2015/0172415 A1* | 6/2015 | Richardson | H04L 29/12066 709/203 |
| 2015/0207733 A1* | 7/2015 | Richardson | H04L 29/12066 709/238 |
| 2017/0111309 A1 | 4/2017 | Halley et al. | |

OTHER PUBLICATIONS

B. Niven-Jenkins et al. RFC 6707 Content Distribution Network Interconnection (CDNI) Problem Statement IETF Sep. 2012 32 pages.

B. Niven-Jenkins et al. Request Routing Redirection Interface for CDN Interconnection draft-ieff-cdni-redirection-11 IETF Jul. 19, 2015 32 pages.

G. Bertrand et al. Use Cases for Content Delivery Network Interconnection, draft-bertrand-cdni-use-cases-00 IETF Jan. 13, 2011 11 pages.

L. Peterson et al. RFC 7336 Framework for Content Distribution Network Interconnection (CDNI) IETF Aug. 2014 58 pages.

* cited by examiner

DELEGATION OF CONTENT DELIVERY TO A LOCAL SERVICE

BACKGROUND

Technical Field

This disclosure relates generally to computer networks and more specifically to systems and methods for delegating content delivery to local content delivery servers.

Description of Related Art

Content Delivery Networks (CDNs), also known as content distribution networks, can include large distributed systems of servers that store content and deliver that content to end users (clients) with high availability and high performance. A CDN service can be effective in speeding the delivery of content, especially in situations when end users are located far from the origin of the content. Thus, the closer a CDN server is to a particular end user both geographically and topologically, the faster the web content will be delivered to that user. The CDN technology also can allow for protection from large surges in web traffic.

For example, when an end user requests a webpage that is part of the content served by a large CDN, the CDN will redirect the user's request from the originating site's server to a server in the CDN that is closest to the end user for further delivery of the requested web content. Redirection can be done via HTTP, via the Domain Name System, or by other means. Currently, CDNs are very popular for delivering a wide range of content including static web content, dynamic web content, mobile content, video, audio, games, and so forth.

CDNs typically rely on the Domain Name System (DNS) to resolve domain names in order to direct a client to the most suitable and easily reachable server for downloading the requested content. The DNS is a hierarchically distributed naming system that resolves domain names assigned to Internet Protocol (IP) addresses. DNS functionality is typically implemented by name servers. For this reason, these servers are called DNS name servers or simply DNS servers. The DNS servers can implement a network service of translation (also commonly referred to as "resolution") of human-memorable domain names, such as www.example.com, into the corresponding numeric IP addresses.

Because of the scale of the Internet, the DNS includes recursive DNS servers and authoritative DNS servers. The recursive DNS server may answer a client query using a previously cached entry in its database. If the recursive server cannot answer the client query because the database does not contain the entry, the recursive server can recursively query authoritative DNS servers (proceeding from the root of the DNS tree down) until the answer is found and the domain name is resolved. This is known as a recursive query or recursive lookup. In other words, recursive DNS servers are responsible for providing the ultimate result (often an IP address) of a corresponding domain name to a requesting client.

As already mentioned above, the recursive DNS servers can cache DNS records from authoritative name servers, and these cached records are checked when a translation request is received. When a recursive DNS server does not have the requested DNS record cached, it can start a recursive process of searching through the authoritative DNS hierarchy in order to complete the translation process. Authoritative DNS servers are responsible for providing answers to recursive DNS servers. The answers of authoritative DNS servers can include IP addresses associated with the domain name and, optionally, other DNS records.

SUMMARY

The present disclosure provides method and systems for delegation of content delivery to local content servers at an ISP using the ISP's recursive name servers. In some example embodiments, the method includes receiving a Domain Name System (DNS) query from a client to resolve a domain name to a network address associated with content, determining that distribution of the content has been delegated by a content provider to a local content server, and based on predetermined delegation criteria, resolving the domain name to the local content server. The client may be a subscriber of an Internet Service Provider (ISP) and the local content server can be designated and managed by the ISP. The content may include games, videos, music, and so forth.

The delegation process by the content provider to the local content server may include receiving a request to delegate distribution of the content, and instructing a provisioning system associated with the ISP to download the content to the local content server. The content provider can be provided with an interface allowing the content owner to configure delegation parameters. The predetermined delegation criteria may include: health and load network parameters, a geographical location of the client, an Internet Protocol (IP) address of the client, the network topology associated with the client, a priority of the Content Delivery Network (CDN), a quality of service associated with the selected local Content Delivery Network (CDN) server and a bandwidth associated with the selected local content delivery server.

The content provider may instantiate, update, or revoke the delegation request at will. Upon such instantiating, updating, or revoking of the delegation request, a cache associated with a provisioning system or a recursive server can be flushed or updated to ensure that DNS queries are properly resolved and content properly served.

The system may allow monitoring health and load parameters of the plurality of local CDN servers by the recursive DNS server, or some other component, and dynamic adjustment, by the recursive DNS server, of the DNS answer based on results of the monitoring to ensure that only healthy servers are used and that load is evenly distributed.

According to another aspect of this disclosure, there is provided a non-transitory processor-readable medium having instructions stored thereon. When these instructions are executed by one or more processors, they cause the one or more processors to implement the above-described method for delegation of content delivery to a local content delivery service.

Additional objects, advantages, and novel features will be set forth in part in the detailed description section of this disclosure, which follows, and in part will become apparent to those skilled in the art upon examination of this specification and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF DRAWINGS

Exemplary embodiments are illustrated by way of example and not limitation in the figures of the accompanying drawings, in which like references indicate similar elements.

DETAILED DESCRIPTION OF EXAMPLE EMBODIMENTS

These exemplary embodiments, which are also referred to herein as "examples," are described in enough detail to enable those skilled in the art to practice the present subject matter. The embodiments can be combined, and other embodiments can be formed, by introducing structural and logical changes without departing from the scope of what is claimed. The following is, therefore, not to be taken in a limiting sense and the scope is defined by the appended claims and their equivalents. Also, in this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated.

The methods and systems disclosed herein can improve delivery of content to end users. Conventionally, content is delivered from locations on the Internet outside of an ISP's network. These locations will be called "remote locations" below to emphasize that they are outside of the ISP's network. Remote servers impose costs for both the content owner and the ISP as information needs to be transferred across the Internet from the content provider to the ISP. Because of the large size of static or real-time video content and the potential for many concurrent uses of the content, these costs can be substantial.

In some example embodiments, the present disclosure provides for delivery of the content from local content servers hosted by an Internet Server Provider (ISP). While normally content provider servers are not part of the ISP network, the proposed solution allows distribution of the content from local content servers associated with the ISP. This approach allows reduced Internet traffic outside of the ISP's network because the ISP can provide the content using its own network that is local to the end users.

Both the ISP and the content provider can benefit because they do not pay for the bandwidth to transfer the same content over the Internet multiple times. Additionally, the ISP can provide superior service by serving content locally, because it has better knowledge of its own network, and because the content can be closer (geographically or topologically) to the end users.

The usual method for delegation of content delivery service to a local content server requires cooperation from the content owner's designated authoritative domain name servers. This is burdensome as while the content owner wants to be able to use their namespace for delivering content, the ISP knows the best answers for the local servers. In an example embodiment, the content provider can delegate its ability to serve certain names directly to the local ISP, but retain the right to monitor the local content provider and revoke the delegation as needed. Thus, delivery of the content becomes more efficient, while the content provider keeps the right to administer the delivery.

In some example embodiments, the delivery of the content can start conventionally from a content server associated with the content provider but then switch to the delegation of content delivery because, for example, the load is particularly high, or the network is particularly congested. An authority for resolving DNS request to the local content server can be responsible for configuring a caching server associated with the local content server. The content provider can communicate with a provisioning system associated with the ISP to provide instructions on how the content is to be provided from the content servers associated with the content provider to the local content servers associated with the ISP.

In some example embodiments, the content provider can receive a request and, in response to the request, contact the provisioning system to delegate that request to the local DNS recursor. For example, if the content includes a game associated with a certain domain name, the content provider can provide the provisioning system with instructions to download the game from its content servers to the local content servers and direct queries related to the game to the local content servers associated with the ISP. Once the game is downloaded, the content owner can verify the content. Upon the verification, the provisioning system can be instructed to start implementing the delegation of the content. This will provide the recursor with the right to start directing the clients to local content servers. Load balancing can be implemented with respect to which of the local servers provide the content based, for example, on which one of the servers is the least busy or using a network that is least loaded. Thus, the criteria as to which local content server is to serve the content can be flexible and the ISP that delegated the authority is free to make its own decision with regards to machines serving the content.

In other words, the content provider can instruct the provisioning system to start overriding the network name associated with the content servers associated with the content provider with network names associated with servers located at the ISP. Thus, when a DNS query arrives at the recursor, it can be answered by a caching server based on configuration provided by the provisioning system. In case of an issue with the content, the content provider can request that the ISP stops distributing the content from the local content severs. Simultaneously or subsequently, the content provider can send a request to the recursor to stop directing clients to the local content services and switch back to the traditional service of provisioning content from the content servers associated with the content provider.

Figure 1:
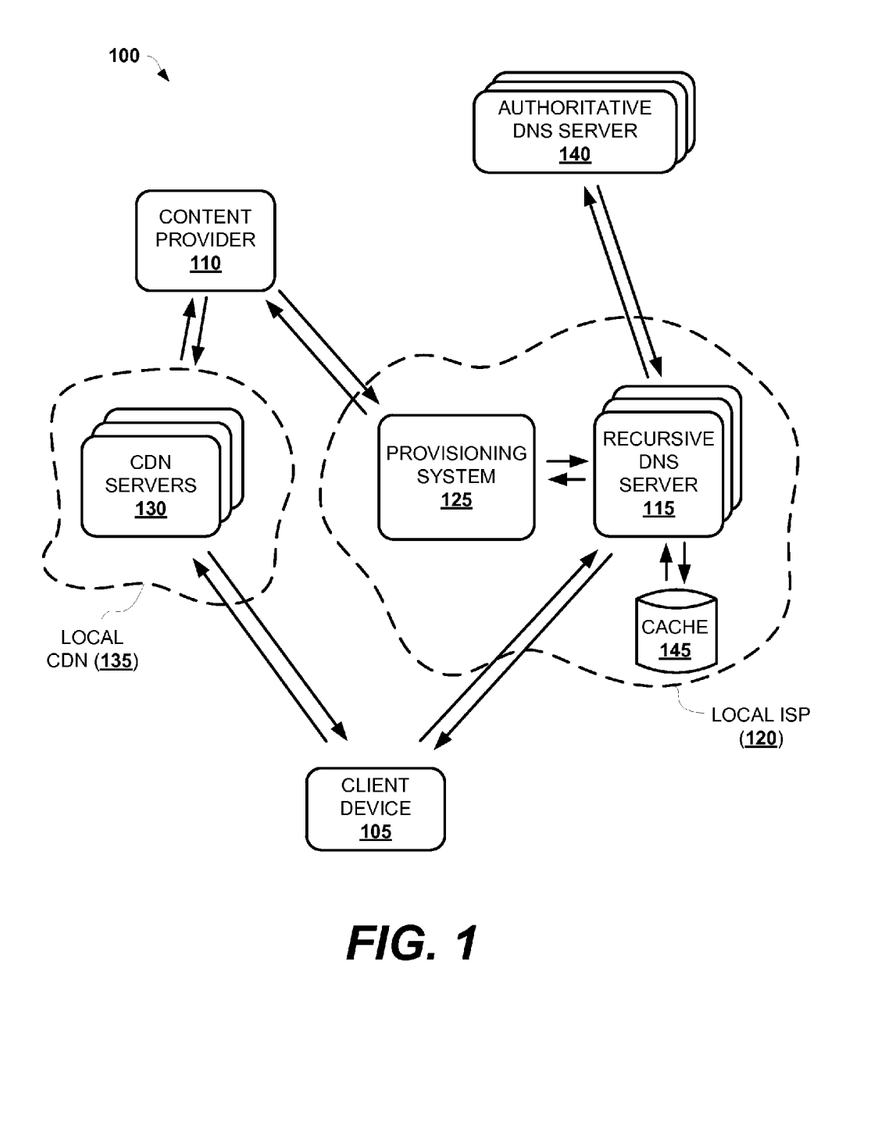
FIG. 1 is a block diagram of an example computer network environment suitable for implementing methods for delegation of content delivery service to a local content server.

FIG. 1 is a block diagram of an example computer network environment suitable for implementing methods for delegation of content delivery service to a local content server. It should be noted, however, that the environment 100 is just one example embodiment provided for illustrative purposes and reasonable deviations of this embodiment are possible.

According to embodiments of this disclosure, a content provider (also known as a content publisher) can delegate resolution service of certain domain or host names in its namespace to one or more recursive DNS servers. The term "resolution service," or simply "resolution," refers to a method of mapping a domain name or host name to a corresponding network address (e.g., an IP address) associated with this domain or host name and delivering the network address in a response to a query received from a client device.

When resolution service is delegated to recursive DNS servers, these recursive DNS servers can ensure that a local CDN provides optimal content delivery service for the delegated domain or host names. The term "delegation" is used herein because an ISP of the recursive DNS server, which performs delegated services, is acting as a content provider's agent and locally overrides DNS answers for the specified domain names.

The content provider can be configured to specify which domain or host names are delegated by communicating with a provisioning system at the ISP level using an appropriate communication protocol. For example, the communication protocol can include a combination of a Representation State Transfer (REST) framework and Hypertext Transfer Protocol (HTTP) known as a "RESTful" system. In some embodiments, the communication protocol can also be in compliance with JavaScript Object Notation (JSON) standard. Accordingly, the communication between the content provider and the provisioning system may be based on a RESTful HTTP and JSON scheme.

According to various embodiments, the provisioning system (or the recursive DNS server or any other computing system at the ISP level) can verify identity or authenticate the content provider as well as its rights to delegate resolution services. For example, there can be a conflict of interests, such as when a content provider of a first company delegates domain or host names pertaining to a second company, which is not affiliated with the first company. When there is a conflict of interests, the provisioning system or the recursive DNS server (or any other computing system at the ISP level) can deny the delegation of resolution services.

The delegation service can be performed using the ISP's local CDN infrastructure. According to some embodiments, the content provider can update or revoke name delegations at any time. Additionally, if the content provider makes any changes to the content, it will automatically cause flushing of a cache (or updating of the cache), which stores prior resolution results, thereby ensuring that the delivery of content is dynamic, responsive, and up to date. In these embodiments, the provisioning system can be configured to ensure that changes were reflected on all relevant recursive DNS servers of the same ISP. In yet more embodiments, the ISP and/or the recursive DNS server can be configured to monitor health and load parameters of the local CDN servers, and adjust DNS answers dynamically, to help provide the best possible service.

The following description includes references to the accompanying drawings, which form a part of the detailed description. The drawings show illustrations in accordance with example embodiments.

As shown in the figure, there is provided a client device 105 (also referred herein to as a "client" for simplicity). The client device 105 generally includes any appropriate computing device having network functionalities allowing communicating under any existing IP protocols. Some examples of the client devices 105 include, but are not limited to, a computer (e.g., laptop computer, tablet computer, desktop computer), cellular phone, smart phone, gaming console, multimedia system, smart television device, set-top box, infotainment system, in-vehicle computing device, informational kiosk, robot, smart home computer, and so forth. The environment may include multiple client devices 105, but these are not shown for ease of understanding.

The client device 105 can be operated by a user who can make certain inquires, such as a request to open a website in a browser, download a file from the Internet, access a web service via a software application, and so forth. The client query may include a domain name or a host name (e.g., in the form of "www.nominum.com"), which requires translation for the purpose of understanding an IP address for further routing.

The whole universe of data, to which the user can request access, is referred herein to as "content," which includes webpages, files (e.g., movies, music, and software), web services, and so forth. The content can be stored by one or more CDNs. For purposes of this disclosure, content originates at a content provider 110, although it should be clear that the environment 100 may include multiple content providers 110. Thus, the client query can be addressed to the content provider 110 so as to access certain content.

In certain embodiments, the client query may include additional data such as client-subnet data. The client-subnet data can include an IP address of the client device 105 or the CIDR block of a network containing or representing the client. Other additional data could include a geographical location, or any other information suitable for processing and facilitation of routing included in the DNS request, as defined by the Extension Mechanisms for DNS (EDNS).

The client query initiated by the client device 105 can be transmitted to a recursive DNS server 115 (also commonly referred to as a DNS resolver), which pertains to a local ISP 120. In certain embodiments, the ISP 120 can include a plurality of recursive DNS server 115. Regardless of implementation, the recursive DNS server 115 is generally responsible for resolving the client query to provide a DNS answer with a network address corresponding to the domain name or hostname contained in the client query. However, the resolution service performed by the recursive DNS server 115 can be based on certain rules associated with the content provider 110.

Specifically, before the recursive DNS server 115 generates any DNS answer, the content provider 110 sends, to a provisioning system 125, a delegation request to provide the requested content to the client 105. As shown in FIG. 1, provisioning system 125 is part of the same local ISP 120 and operatively connected to the plurality of recursive DNS servers 115. In some embodiments, the provisioning system 125 is a stand-alone computing system, which facilitates communication between the recursive DNS servers 115 and the content provider 110. In yet other embodiments, however, the provisioning system 125 may include a software module or an application installed on the recursive DNS server 110, such that it is an integrated part of recursive DNS server 110.

The provisioning system 125 can provide various services facilitating routing and optimal delivery of the content to the client 105. For example, in some embodiments, the provisioning system 125 can verify or authenticate the content provider 110, which allows for resolving any conflict of interests. Specifically, the delegation request sent from the content provider 110 can be denied by the provisioning system 125 (or the recursive DNS server 115) if it is determined that a conflict of interests exists between the ISP and the content provider, or when the content provider 110 could not be authenticated.

In some embodiments, the provisioning system 125 can receive priority values for delegation requests from content providers 110 for a given content. The provisioning system 125 can then prioritize which CDN servers 130 to use.

The communication between the content provider 110 and the provisioning system 125 can be arranged in such a manner that authentication of the content provider 110 can be enhanced or simplified. For example, as discussed above, the communication between the content provider 110 and the provisioning system 125 may be provided in accord with a RESTful HTTP and JSON scheme.

Once the content provider 110 is authenticated, the delegation request can be served by the provisioning system 125 to the recursive DNS server 115 within the same local ISP 120. In this sense, the recursive DNS server 115 becomes an "agent" of the content provider 110 to organize the best possible delivery of the web content to the client. Thus, the recursive DNS server 115 generates a DNS answer by resolving the domain name of the client query to a network address (e.g., an IP address). This resolution is performed in such a manner that the recursive DNS server 115 selects an optimal CDN server the CDN servers 130. In these CDN servers 130, each CDN server can store copies of the web content that was requested by the client 105. Moreover, a copy of the web content can be stored across more than one CDN server.

The selection of this CDN server from the CDN servers 130 can be based on predetermined rules and one or more criteria. These criteria may include at least one of the following: health and load network parameters, a geographical location of the client, an IP address of the client, a network topology associated with the client, a priority of the CDN network, a quality of service associated with the selected local CDN server, and a bandwidth associated with the selected local CDN server. If the recursive DNS server 115 cannot select an appropriate or optimal CDN server, the recursive DNS server 115 can proceed with selecting a default CDN server the CDN servers 130, or query one or more authoritative DNS servers 140.

Once the optimal CDN server is selected or determined by the recursive DNS server 115 and the DNS answer with a network address of the optimal CDN server is generated, the recursive DNS server 115 sends the DNS answer to the client 105. Thus, the client 105 can use the DNS answer to access a copy of the requested content stored on the optimal CDN server. In this context, the term "optimal" means that the optimal CDN server can serve the content in the most effective way compared to the remaining CDN servers 130. Thus, this may result in faster downloading speeds of the content.

According to certain embodiments, the provisioning system 125 is configured to ensure that results of the resolution of the domain name to the network address (i.e., the generated DNS answer) is propagated to further recursive DNS servers 115 of the same local ISP 120. This will ensure that similar client queries can be processed in a similar manner. Specifically, there can be provided one or more caches 145, which can store DNS records associated with prior DNS resolutions. Accordingly, upon receiving new client queries, the recursive DNS servers 115 can address the cache 145 to look up a cached resolution result to ensure faster service. In some embodiments, however, the content provider 110 is operable to instantiate, update, or revoke the delegation request sent to the provisioning system 125. For example, this update or revocation may be needed when certain content of the content provider 110 is no longer available to a particular client. Such content can be modified or updated. Thus, upon update or revocation of the delegation request by the content provider 110, the cache 145 associated with the provisioning system 125 and/or the recursive DNS server 115 is flushed and/or updated to ensure that the content is current for the client 105.

In yet further embodiments, the ISP 120, the provisioning system 125, and/or the recursive DNS server 115 can be configured to periodically monitor health and load parameters of the plurality of local CDN servers 130. These health and load parameters may include, for example, quality of service, bandwidth, error rates, bit rates, transmission delays, network or server availability, jitters, and so forth. Based on the results of monitoring the health and load parameters, the recursive DNS server 115 can dynamically adjust the DNS answers to ensure the client 105 is routed to the currently optimal CDN server.

In some additional embodiments, the provisioning system 125 can be also configured to dynamically monitor the resolution service of the recursive DNS server 115 and communicate this result to the content provider 110. For example, in some embodiments, the content provider 110 can send, to the provisioning system 125, a request to confirm that the domain name has been resolved by the recursive DNS server 115. In response, the provisioning system 125 sends back, to the content provider 110, a confirmation message that the domain name has been successfully resolved.

Figure 2:
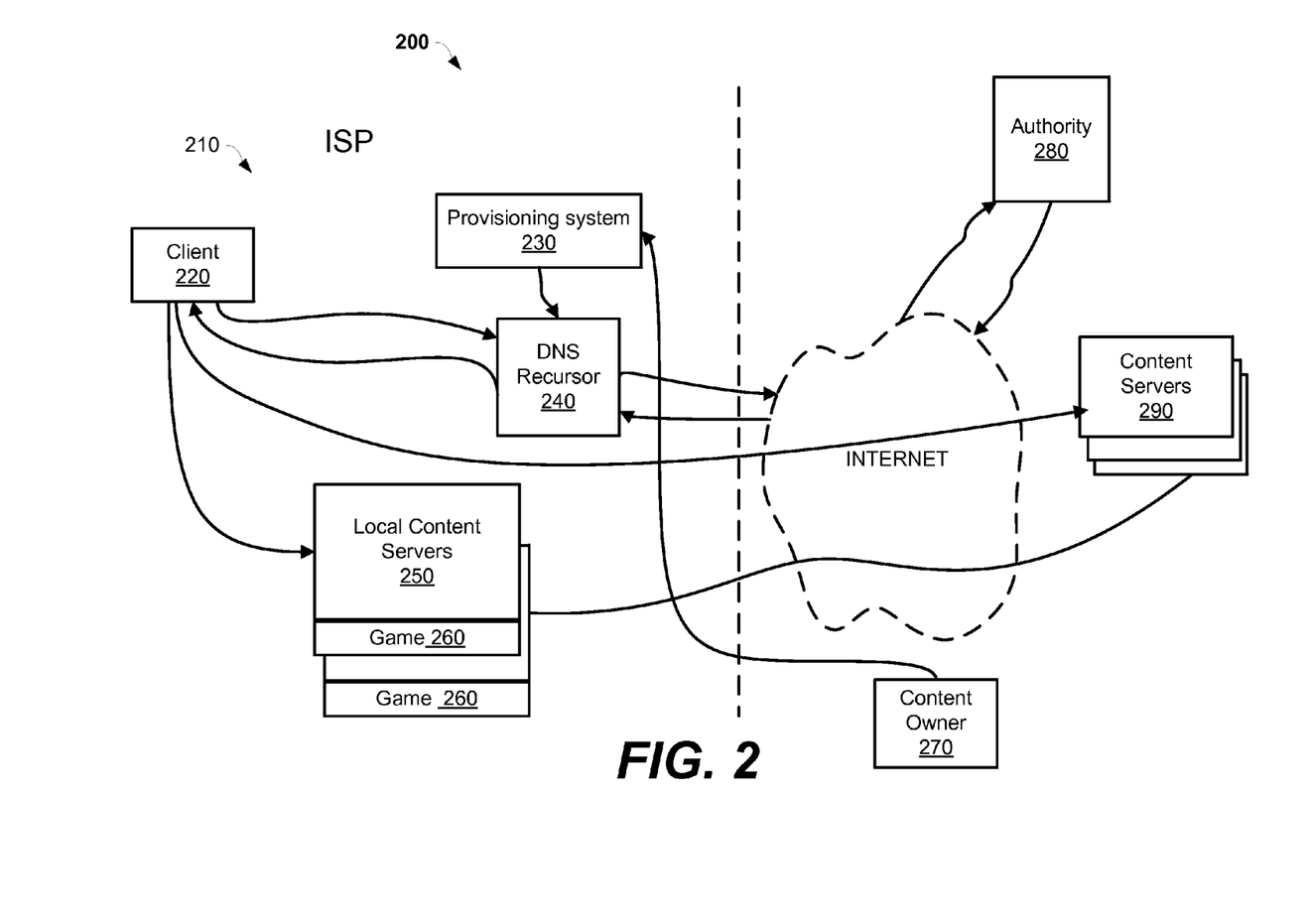
FIG. 2 is a block diagram illustrating a system for delegation of content delivery service to a local content server.

FIG. 2 is a block diagram illustrating a system 200 for delegation of content delivery service to local content servers 250. As shown in the figure, a DNS recursor 240 can receive a Domain Name System (DNS) query from a client 220 to resolve a domain name to a network address associated with content. Since the content distribution has been delegated by content owner 270 to ISP 210 local content servers 260, recursor 240 resolves the client query to the local content servers 250. The client 220 is a subscriber of ISP 210 and the local content servers 250 can be designated and managed by the ISP 210. The name resolution can be implemented by DNS recursor 240 configured to refer to the local content servers 250 after verification of the content by the content owner 270. The content may include a game 260, a video (not shown), and a song (not shown).

The delegation process by the content owner 270 to the local content servers 250 may include receiving a request from the content owner 270 to delegate distribution of the content, and instructing a provisioning system 230 associated with the ISP 210 to download the content to the local content servers 250. The content owner 270 can be provided with an interface allowing the content owner 270 to configure delegation parameters. The predetermined delegation criteria may include: health and load network parameters, a geographical location of the client, an Internet Protocol (IP) address of the client 220, a network topology associated with the client 220, a quality of service associated with the selected local Content Delivery Network (CDN) server, and a bandwidth associated with the selected local content servers 250.

The content owner 270 can be operable to instantiate, update, or revoke the delegation request. Upon such instantiating, updating, or revoking of the delegation request, a cache associated with the provisioning system 230 or the DNS recursor 240 can be flushed or updated to ensure that DNS queries are properly resolved. The resolution of the domain name can include responding to the DNS query with an answer from a caching server based on predetermined configurations, and returning, to the client 220, the answer pointing to the local content servers 250, wherein upon receiving the answer, the client 220 can establish a data communication channel with the local content servers 250.

The resolution of the domain name may include searching a cache associated with DNS recursor 240, and upon locating an answer, serving the answer to the client 220. If, however, the cache does not have the answer, the method may proceed to submit, by the DNS recursor 240, the DNS query to an authority 280, and receive, from the authority 280, the network address associated with the local content servers 250. Furthermore, the system 200 may allow monitoring health and load parameters of the plurality of local content servers 250 and adjusting, by the DNS recursor 240, the DNS answer based on results of the monitoring.

Figure 3:
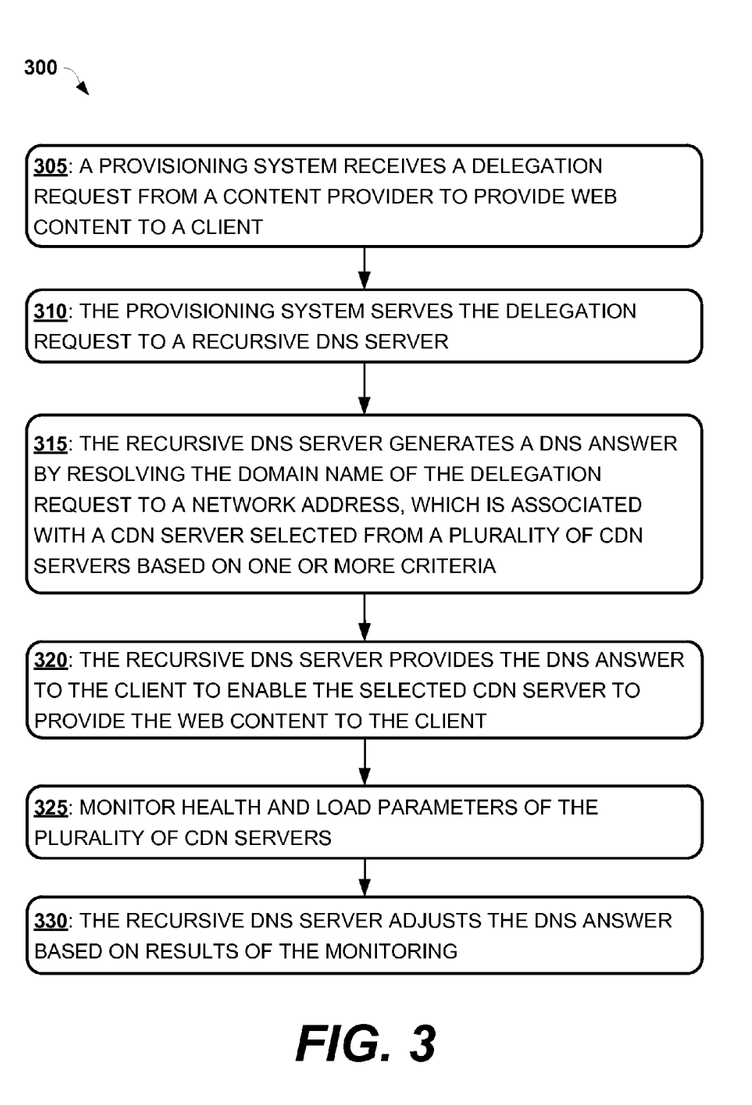
FIG. 3 illustrates a flow chart of a method for delegation of content delivery service to a local content server.

FIG. 3 illustrates a flow chart of a method for delegation of content delivery service to a local content server. The method 300 may be performed by processing logic that may comprise hardware (e.g., decision-making logic, dedicated logic, programmable logic, and microcode), software (such as software run on a general-purpose computer system or a dedicated machine), or a combination of both. In one example embodiment, the processing logic refers to one or more components of the provisioning system 125 or the recursive DNS server 115. Notably, below recited steps of the method 300 may be implemented in an order different than described and shown in the figure. Moreover, the method 300 may have additional steps not shown herein, but which can be evident for those skilled in the art from the present disclosure. The method 300 may also have fewer steps than outlined below and shown in FIG. 3.

The method 300 may commence at operation 305 with a content provider 110 sending a delegation request to a provisioning system 125. The delegation request can include a domain name or host name associated with content requested by a client 105 (for example, in a client query). At operation 310, the provisioning system 125 serves the delegation request to a recursive DNS server 115, which is associated with an ISP 120 that is local to the client 105. The provisioning system 125 is also associated with the same ISP as the recursive DNS server 115.

At operation 315, the recursive DNS server 115 generates a DNS answer by resolving the domain name of the delegation request to a network address. The DNS answer can be stored in a cache 145. The network address in the DNS answer is provided by the recursive DNS server 115 in such a way that this network address designates a particular CDN server 130, which can provide access to the web content for the client 105 in the best possible manner compared to other CDN servers 130 available on the same ISP level. The selection of a particular CDN server 130 can be based on one or more criteria, which include at least one of the following: health and load network parameters, a geographical location of the client 105, an IP address of the client 105, the network topology associated with the client 105, a priority of the CDN network, a quality of service associated with the selected CDN server 130, and a bandwidth associated with the selected CDN server 130.

At operation 320, the recursive DNS server 115 provides the DNS answer to the client 105 to enable the selected CDN server 130 to provide the requested web content to the client 105.

At operation 325, the ISP 120, the provisioning system 125, and/or the recursive DNS server 115 monitor health and load parameters of the plurality of CDN servers 130. The health and load parameters may include bandwidth, quality of service, availability, bit rates, error rates, and so forth.

At operation 330, the recursive DNS server adjusts the DNS answer based on results of the monitoring. Thus, the recursive DNS server can resend the adjusted DNS answer to the client 105 and/or store the adjusted DNS answer to the cache 145.

Figure 4:
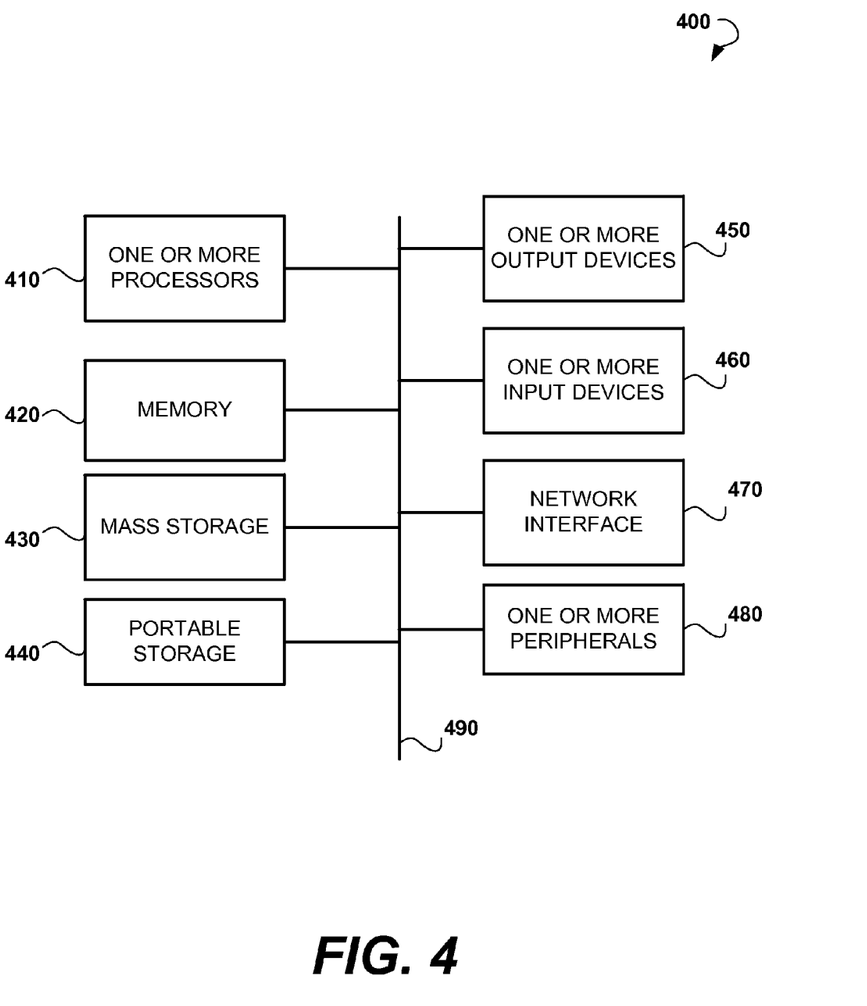
FIG. 4 is a computer system that may be used to implement methods for delegation of content delivery service to a local content server.

FIG. 4 illustrates an exemplary computing system 400 that may be used to implement embodiments described herein. System 400 of may be implemented in the contexts of the likes of client device 105, recursive DNS server 115, content provider 110, CDN server 130, and provisioning system 125. The computing system 400 of FIG. 4 may include one or more processors 410 and memory 420. Memory 420 stores, in part, instructions and data for execution by processor 410. Memory 420 can store the executable code when the system 400 is in operation. The system 400 of FIG. 4 may further include a mass storage device 430, portable storage medium drive(s) 440, one or more output devices 450, one or more input devices 460, a network interface 470, and one or more peripheral devices 480.

The components shown in FIG. 4 are depicted as being connected via a single bus 490. The components may be connected through one or more data transport means. Processor 410 and memory 420 may be connected via a local microprocessor bus, and the mass storage device 430, peripheral device(s) 480, portable storage device 440, and network interface 470 may be connected via one or more input/output (I/O) buses.

Mass storage device 430, which may be implemented with a magnetic disk drive or an optical disk drive, is a non-volatile storage device for storing data and instructions for use by a magnetic disk or an optical disk drive, which in turn may be used by processor 410. Mass storage device 330 can store the system software for implementing embodiments described herein for purposes of loading that software into memory 420.

Portable storage medium drive(s) 440 operates in conjunction with a portable non-volatile storage medium, such as a compact disk (CD), or digital video disc (DVD), to input and output data and code to and from the computer system 400 of FIG. 4. The system software for implementing embodiments described herein may be stored on such a portable medium and input to the computer system 400 via the portable storage medium drive(s) 440.

Input devices 460 provide a portion of a user interface. Input devices 460 may include an alphanumeric keypad, such as a keyboard, for inputting alphanumeric and other information, or a pointing device, such as a mouse, a trackball, a stylus, or cursor direction keys. Additionally, the system 400 as shown in FIG. 4 includes output devices 450. Suitable output devices include speakers, printers, network interfaces, and monitors.

Network interface 470 can be utilized to communicate with external devices, external computing devices, servers, and networked systems via one or more communications networks such as one or more wired, wireless, or optical networks including, for example, the Internet, intranet, local area network (LAN), wide area network (WAN), cellular phone networks (e.g. Global System for Mobile (GSM) communications network, packet switching communications network, circuit switching communications network), Bluetooth radio, and an IEEE 802.11-based radio frequency network, among others. Network interface 370 may be a network interface card, such as an Ethernet card, optical transceiver, radio frequency transceiver, or any other type of device that can send and receive information. Other examples of such network interfaces may include Bluetooth®, 3G, 4G, and WiFi® radios in mobile computing devices as well as a Universal Serial Bus (USB).

Peripherals 480 may include any type of computer support device to add additional functionality to the computer system. Peripheral device(s) 480 may include a modem or a router. The components contained in the computer system 400 of FIG. 4 are those typically found in computer systems that may be suitable for use with embodiments described herein and are intended to represent a broad category of such computer components that are well known in the art. Thus, the computer system 400 of FIG. 4 can be a personal computer (PC), hand held computing device, telephone, mobile computing device, workstation, server, minicomputer, mainframe computer, or any other computing device. The computer can also include different bus configurations, networked platforms, multi-processor platforms, and so forth. Various operating systems (OS) can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the invention. Those skilled in the art are familiar with instructions, processor(s), and storage media.

It is noteworthy that any hardware platform suitable for performing the processing described herein is suitable for use with the invention. The terms "computer-readable storage medium" and "computer-readable storage media" as used herein refer to any medium or media that participate in providing instructions to a Central Processing Unit (CPU) for execution. Such media can take many forms, including, but not limited to, non-volatile media, volatile media, and transmission media. Non-volatile media include, for example, optical or magnetic disks, such as a fixed disk. Volatile media include dynamic memory, such as system random access memory (RAM). Transmission media include coaxial cables, copper wire, and fiber optics, among others, including the wires that include one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-read-only memory (ROM) disk, DVD, any other optical medium, any other physical medium with patterns of marks or holes, a RAM, a PROM, an EPROM, an EEPROM, a FLASHEPROM, any other memory chip or cartridge, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Thus, methods and systems for delegation of content delivery service to local service have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense. There are many alternative ways of implementing the present technology. The disclosed examples are illustrative and not restrictive. Moreover, in this disclosure, some interchangeable terminology can be used. For example, a client query can also be referred to as a request or an inquiry, but the meaning of these terms shall be the same. The term "subnet" is short for a sub-network and shall mean a separate part of a larger computing network. Typically, a subnet may represent all the machines at one geographic location, in one building, or on the same LAN.

What is claimed is:

1. A method for delegation of content delivery service to an Internet Service Provider, the method comprising:
   A. at a content provider server:
      (i) sending a delegation request to a provisioning system of an Internet Service Provider, the delegation request comprising an instruction to begin implementing delegation of a content associated with a domain name, the implementation of the delegation comprising overriding Domain Name System (DNS) answers associated with the domain name;
   B. at the provisioning system, receiving the delegation request, and providing the delegation request to a recursive DNS server managed by the Internet Service Provider;
   C. at the recursive DNS server managed by the Internet Service Provider:
      (i) receiving the delegation request from the provisioning system;
      (ii) receiving a client Domain Name System (DNS) query to resolve the domain name to a network address;
      (iii) in response to the client DNS query, implementing the delegation specified in the delegation request at least by overriding Domain Name System (DNS) answers associated with the domain name, and resolving the domain name to a local content server managed by the Internet Service Provider.

2. The method of claim 1, wherein resolving the domain name includes:
   searching a cache associated with the recursive DNS server; and
   upon locating an answer, serving the answer to the client DNS query.

3. The method of claim 1, wherein resolving the domain name includes:
   submitting, by the recursive DNS server, the client DNS query to a local authoritative DNS server instead of an authoritative DNS server associated with the content provider; and
   receiving, from the local authoritative DNS server, the network address associated with the local content server managed by the Internet Service Provider.

4. The method of claim 1, wherein the content provider server revokes the delegation to the local content server managed by the Internet Service Provider, said revocation being subsequent to the delegation request and said revocation comprising an instruction to stop implementing delegation of the content associated with the domain name.

5. The method of claim 4, wherein upon the revoking of the delegation request, a cache associated with the provisioning system or the recursive DNS server is flushed or updated to ensure that DNS queries are to be properly resolved.

6. The method of clam 1, wherein the delegation request includes:
   an instruction to the provisioning system associated with the Internet Service Provider to download the content to the local content server.

7. The method of claim 1, wherein the content includes at least one of the following: a game, a video, or music.

8. The method of claim 1, further comprising providing an interface to allow a content provider to configure delegation parameters.

9. The method of claim 1, wherein the recursive DNS server is configured to refer to the local content server managed by the Internet Service Provider after verification of the content by the content provider.

10. The method of claim 1, further comprising:
monitoring health and load parameters of a plurality of local content servers managed by the Internet Service Provider; and
adjusting, by the recursive DNS server, the resolution of the domain name based on results of the monitoring.

11. The method of claim 1, wherein the provisioning system is integrated into the recursive DNS server as any of: a software module and an application.

12. A computer-implemented system comprising:
A. a content provider server comprising at least one processor and a memory storing processor-executable codes, wherein the at least one processor is configured to:
  (i) send a delegation request to a provisioning system of an Internet Service Provider, the delegation request comprising an instruction to begin implementing delegation of a content associated with a domain name, the implementation of the delegation comprising overriding Domain Name System (DNS) answers associated with the domain name;
B. the provisioning system configured to receive the delegation request, and provide the delegation request to a recursive DNS server managed by the Internet Service Provider;
C. the recursive Domain Name System (DNS) server managed by the Internet Service Provider comprising at least one processor and a memory storing processor-executable codes, wherein the at least one processor is configured to:
  (i) receiving the delegation request from the provisioning system;
  (i) receive the delegation request from the provisioning system;
  (ii) receive a client Domain Name System (DNS) query to resolve the domain name to a network address;
  (iii) (iii) in response to the client DNS query, implementing the delegation specified in the delegation request at least by overriding Domain Name System (DNS) answers associated with the domain name, and resolve the domain name to a local content server managed by the Internet Service Provider.

13. The system of claim 12, wherein resolving the domain name includes:
responding to the client DNS query with an answer from a caching server based on predetermined configurations.

14. The system of claim 12, wherein resolving the domain name includes:
searching a cache associated with the recursive DNS server; and
upon locating an answer, serving the answer to the client DNS query.

15. The system of claim 12, wherein resolving the domain name includes:
submitting, by the recursive DNS server, the client DNS query to a local authoritative DNS server; and
receiving, from the local authoritative DNS server, the network address associated with the local content server managed by the Internet Service Provider.

16. The system of claim 12, wherein the provisioning system is integrated into the recursive DNS server as any of: a software module and an application.

17. A non-transitory processor-readable medium having instructions stored thereon, which when executed by one or more processors, cause the one or more processors to implement a method, comprising:
A. at a content provider server:
  (i) send a delegation request to a provisioning system of an Internet Service Provider, the delegation request comprising an instruction to begin implementing delegation of a content associated with a domain name, the implementation of the delegation comprising overriding Domain Name System (DNS) answers associated with the domain name;
B. at the provisioning system, receiving the delegation request, and providing the delegation request to a recursive DNS server managed by the Internet Service Provider;
C. at the recursive Domain Name System (DNS) server managed by the Internet Service Provider:
  (i) receiving the delegation request from the provisioning system;
  (ii) receiving a client Domain Name System (DNS) query to resolve the domain name to a network address;
  (iii) in response to the client DNS query, implementing the delegation specified in the delegation request at least by overriding Domain Name System (DNS) answers associated with the domain name, and resolving the domain name to a local content server managed by the Internet Service Provider.

18. The non-transitory processor-readable medium of claim 17, wherein the provisioning system is integrated into the recursive DNS server as any of: a software module and an application.

* * * * *